US012307302B2

(12) United States Patent
Gao et al.

(10) Patent No.: US 12,307,302 B2
(45) Date of Patent: May 20, 2025

(54) CASE DEFLECTION USING VISIBILITY INTO MULTI-PRODUCT CLOUDS

(71) Applicant: Cisco Technology, Inc., San Jose, CA (US)

(72) Inventors: Zizhen Gao, San Ramon, CA (US); David C. White, Jr., St. Petersburg, FL (US); Chidambaram Arunachalam, Apex, NC (US); Carlos M. Pignataro, Cary, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 707 days.

(21) Appl. No.: 17/476,916

(22) Filed: Sep. 16, 2021

(65) Prior Publication Data

US 2023/0090203 A1    Mar. 23, 2023

(51) Int. Cl.
*G06F 9/50*     (2006.01)
*G06F 9/445*    (2018.01)

(52) U.S. Cl.
CPC ........ *G06F 9/5072* (2013.01); *G06F 9/44505* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 2012/0297016 A1* | 11/2012 | Iyer | H04L 43/06 709/217 |
| 2015/0227405 A1* | 8/2015 | Jan | G06F 11/0778 714/37 |
| 2015/0227406 A1* | 8/2015 | Jan | G06F 11/0709 714/37 |
| 2018/0115463 A1 | 4/2018 | Sinha et al. | |
| 2019/0132223 A1 | 5/2019 | Greisen et al. | |
| 2019/0163550 A1 | 5/2019 | Harutyunyan et al. | |
| 2019/0306045 A1 | 10/2019 | Avdesh Khanna | |
| 2021/0011825 A1 | 1/2021 | Aggarwal et al. | |
| 2021/0126839 A1* | 4/2021 | Rudrachar | H04L 41/40 |
| 2021/0184953 A1* | 6/2021 | Huang | H04L 45/28 |

(Continued)

OTHER PUBLICATIONS

Bonniot, Loïck, Christoph Neumann, and François Taïani. "DiagNet: towards a generic, Internet-scale root cause analysis solution." arXiv preprint arXiv:2004.03343 (2020). (Year: 2020).*

*Primary Examiner* — Frank D Mills

(74) *Attorney, Agent, or Firm* — Edell, Shapiro & Finnan, LLC

(57) ABSTRACT

Methods are provided in which a cloud portal, serving as an orchestrator device, obtains a request for diagnostics data to monitor performance of a cloud-based service executing in a provider cloud network and accessed by a client device in an enterprise network and obtains service information about a plurality of assets involved in providing the cloud-based service. The plurality of assets are managed by at least a first cloud-based management entity and a second cloud-based management entity. The methods further include collecting the diagnostics data about the plurality of assets based on the service information, aggregating the diagnostics data to form a multi-cloud diagnostics data, and determining the performance of the cloud-based service based on the multi-cloud diagnostics data.

20 Claims, 8 Drawing Sheets

(56) References Cited

U.S. PATENT DOCUMENTS

2021/0297417 A1\* 9/2021 Pogrebinsky ......... H04L 63/107
2021/0377338 A1\* 12/2021 Pannem ................. H04L 41/40
2023/0054912 A1\* 2/2023 Dixit J .................... H04L 67/10

\* cited by examiner

CASE DEFLECTION USING VISIBILITY INTO MULTI-PRODUCT CLOUDS

TECHNICAL FIELD

The present disclosure relates to computer networks and systems.

BACKGROUND

Services provided to an enterprise often traverse multiple networks that are managed by different on-premise and cloud-based network management systems. These networks have numerous instances and types of equipment and software. Tracking performance and troubleshooting for networking or equipment and software in these multi-cloud networks can be time consuming and may require involvement of multiple entities such as the enterprise, the service provider, and/or third party vendor entities.

DESCRIPTION OF EXAMPLE EMBODIMENTS

Overview

Figure 1:
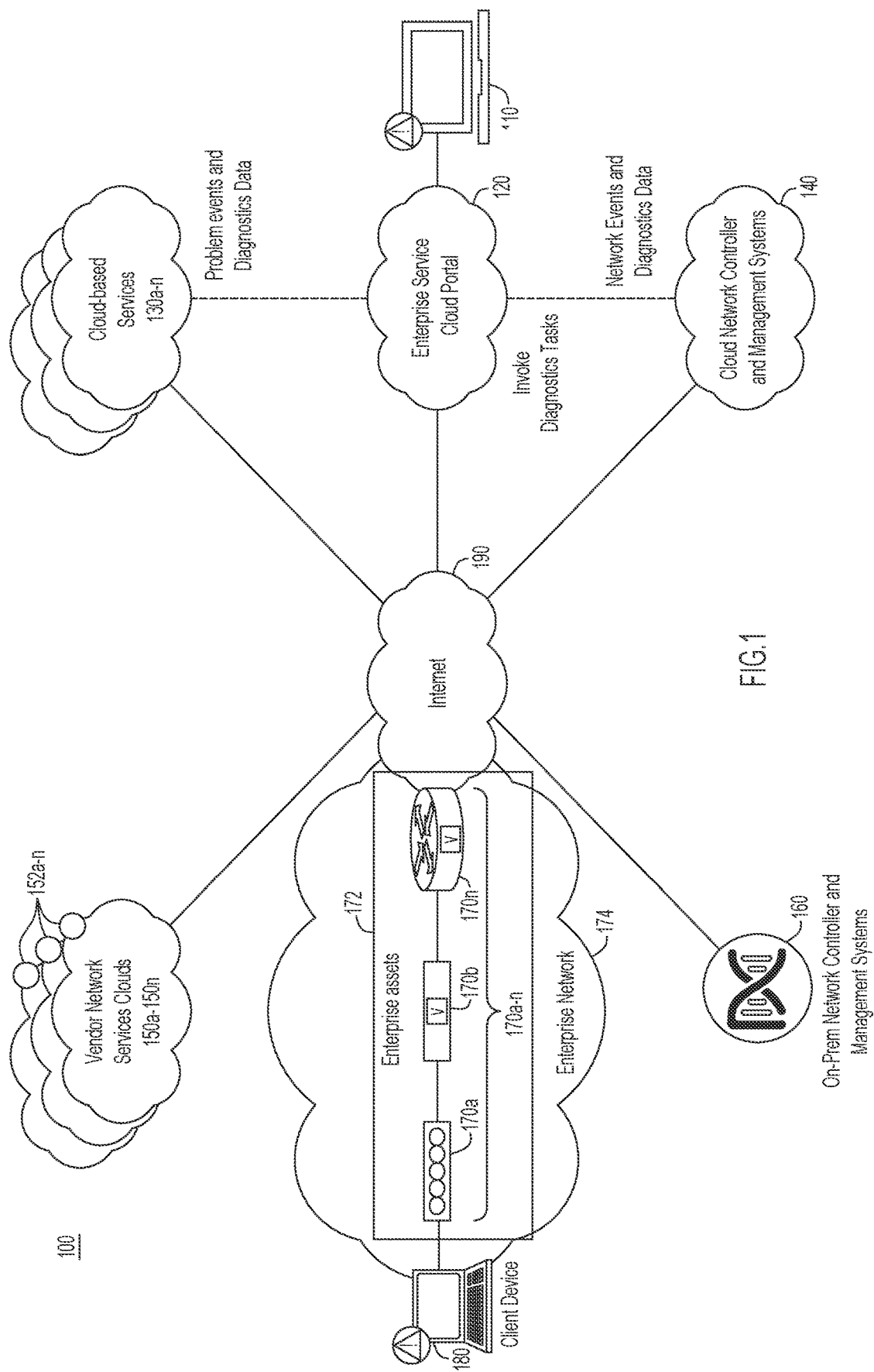
FIG. 1 is a block diagram of a system for multi-cloud troubleshooting orchestration, according to an example embodiment.

Briefly, methods are presented for collecting, aggregating, and analyzing multi-cloud diagnostics data to monitor performance of a cloud-based service and to suggest next steps in troubleshooting or solving a performance issue in the cloud-based service. In one example, a method is provided that is performed by an orchestrator device or process/service, and involves obtaining a request for diagnostics data to monitor performance of a cloud-based service executing in a provider cloud network and accessed by a client device in an enterprise network. The method includes obtaining service information about a plurality of assets involved in providing the cloud-based service. The plurality of assets are managed by at least a first cloud-based management entity and a second cloud-based management entity. The method further includes collecting the diagnostics data about the plurality of assets based on the service information, aggregating the diagnostics data to form a multi-cloud diagnostics data, and determining the performance of the cloud-based service based on the multi-cloud diagnostics data.

EXAMPLE EMBODIMENTS

Cloud services, such as software-as-a-service (SasS), are now common. The power of a cloud has made it easier for people and enterprises to use these services at any time and from anywhere. Cloud services typically traverse multiple networks that are managed by different network management systems. Networks may include a combination of hardware devices and software deployed on-premise (on-prem) or in the cloud. Increasingly, these devices and software are controlled by software defined network controllers or are managed by cloud based management systems. When performance issues arise in a cloud service or when performance of the cloud service needs to be monitored and evaluated, many entities become involved, which can be cumbersome and time consuming.

For example, a collaboration cloud service allows people to collaborate in a virtual meeting across the world. However, troubleshooting audio and/or video quality issues observed by end users in an enterprise, school, university, retail store, hospital etc. can be a complex task. The audio and video streams between the end user's device and media nodes in the collaboration cloud service typically traverse multiple networks that are managed by different on-premise and cloud-based network management systems. Network administrators lack visibility inside the cloud and hence, open a support ticket (a case) to obtain troubleshooting assistance from the collaboration cloud service provider. The support engineers of the collaboration cloud service provider handling the case do not have full access to the end-to-end network, which impedes their ability to find the root cause of the media quality issue. The support engineers arrange troubleshooting sessions with the enterprise (the network administrator) and gather diagnostics data both from the virtual meetings application, media nodes within the cloud, and the network devices on-premise and in the cloud, attempting to narrow down the root cause of the problem such as a packet loss introduced at a particular device. This problem is further exacerbated if the on-premise network devices or software are managed by a 3rd party network management cloud such as a vendor network services cloud. In this case, the support engineers need to work with the enterprise and the vendor network service cloud.

The techniques presented herein provide a mechanism to troubleshoot and monitor performance of these complex networks. Specifically, a troubleshooting orchestrator device or service identifies assets of interest from a troubleshooting perspective based on an issue detected in the cloud-based service, then identifies the on-premise and cloud-based network management systems that manage these assets (devices and/or software), requests and collects multi-cloud diagnostics data from the respective clouds and analyzes the diagnostics data to find the root cause of the issue. This mechanism empowers a network administrator to troubleshoot the issue in a self-service manner and enables cloud-based service providers to deflect cases at a large scale.

FIG. 1 is a block diagram of a system 100 for multi-cloud troubleshooting orchestration, according to an example embodiment. The system 100 includes a network operator console 110, an enterprise service cloud portal 120 (cloud portal) that serves as a multi-cloud troubleshooting orchestrator, cloud-based services 130a-n, cloud network controller and management systems 140, vendor network services clouds 150a-n with respective network controllers 152a-n, on-premise (on-prem) network controller and management systems 160, an enterprise network 174 that has enterprise assets 172 including network devices 170a-n, a client device 180, and the Internet 190.

The notation "a-n" denotes that a number is not limited, can vary widely, and depends on a particular use case scenario. This is an example of the system 100 and number and types of entities varies based on a particular deployment and use case scenario such as the type of the cloud-based service being provided to the client device 180 and the network structures of various networks.

The entities (nodes, network devices, computing devices, etc.) of the system 100 may directly communicate with one another via one or more networks such as a local area network (LAN), a wide area network (WAN) such as the Internet 190, or a combination thereof, and includes wired, wireless, or fiber optic connections. In general, the one or more networks can use any combination of connections and protocols that support communications between the entities of the system 100.

In various example embodiments, the entities of the system 100 may each include a network interface, at least one processor, and a memory. Each entity may be any programmable electronic device capable of executing computer readable program instructions. The network interface may include one or more network interface cards that enable components of the entity to send and receive data over the one or more networks. Each entity may include internal and external hardware components such as those depicted and described in further detail in FIG. 8.

The network operator console 110 may run on a user device or in the cloud for managing and monitoring an enterprise network. The network operator console 110 includes a user interface configured to obtain inputs from a user, such as a network administrator, and is configured to provide outputs to the user. The network operator console 110 communicates with and/or configures one or more of the enterprise assets 172 such as the network devices 170a-n of the enterprise network 174, via the cloud portal 120, using a secure shell (SSH) connection, for example. The network operator console 110 requests data and/or action(s) from various entities in the system 100 and obtains data or results from these entities as output on a display. The output may include the diagnostics data, performance-related data of a cloud-based service or services, actions for resolving a performance issue with the cloud-based service, a contextual insight about the performance issue, and a set of automated available actions to resolve the performance issue. The automated action may change a configuration of one or more assets such as enable or disable a certain feature, upgrade software, connect a router to a network, etc.

The enterprise service cloud portal (cloud portal) 120 serves as a troubleshooting orchestrator, according to an example embodiment. The cloud portal 120 interacts with various entities in the system 100.

The cloud portal 120 is driven by human and digital intelligence that serves as a one-stop destination for equipment and software of an enterprise to access insights and expertise when needed and specific to a particular stage of an adoption lifecycle for various network technologies. Examples of capabilities include assets and coverage, cases (errors or issues to troubleshoot), automation workbench, insights with respect to various stages of an adoption lifecycle and how to progress to the next stage, and so on. In other words, the cloud portal 120 is a SaaS system that tracks the enterprise's adoption lifecycle of various network technologies of an enterprise and helps the enterprise to monitor performance and solve issues encountered with the cloud-based services 130a-n by collecting the diagnostics data.

The cloud portal 120 communicates with various network management clouds and on-prem network controllers to discover the enterprise network 174 and to build an inventory of the enterprise assets 172 along with useful metadata. The cloud portal 120 also communicates with cloud-based services 130a-n to obtain end user's usage details, usage statistics, and other telemetry data of the client device 180. Similarly, the cloud portal 120 connects to other clouds involved in providing the cloud-based services 130a-n, such as security and network management clouds (Internet of Things (IoT) clouds), to obtain service capabilities of the enterprise assets 172 such as the network devices 170a-n.

The communication exchange between the cloud portal 120 and other clouds is enabled by an enterprise based on enterprise policies. Network management clouds, service provider cloud, security cloud, vendor network services clouds 150a-n, etc. provide, to the cloud portal 120, a list of the enterprise assets 172 that are managed by the respective cloud and an attribute set for each asset on the list. The enterprise assets 172 include hardware and/or software such as hardware device, virtual devices, and software.

The asset attribute set includes information about the asset such as a device model, domain names, a serial number (SN), a universally unique identifier (UUID), IP address ranges, managing device, etc. As an example, the on-prem network controller and management systems 160 may provide information about a first network device 170a such as a router, type A, at a location B, with a SN of FOC2140NJAB, managed by the on-prem network controller and management systems 160 with UUID of 213e4567-e89b-12d3-a456-426655240503. These notation are examples and any number or letter format may be used that uniquely identifies the asset. The cloud portal 120 invokes one or more diagnostic tasks to collect diagnostics data from the enterprise assets 172 (the network devices 170a-n) of various clouds that are involved in providing one or more of the cloud-based services 130a-n to the client device 180, as detailed below.

The cloud-based services 130a-n include a wide variety of services offered to an enterprise. Some non-limiting examples include collaboration services, multimedia services, voice-over-IP services, accounting services, recording services, network security services, document management services, etc.

The cloud network controller and management systems 140 are management entities that include cloud-managed information technology (IT) solutions that manage security of various client devices, network assets, and users in an enterprise by applying various security policies. Additionally, the cloud network controller and management systems 140 may manage the configuration of the enterprise assets 172.

The vendor network services clouds 150a-n are management entities that manage some of the enterprise assets 172. For example, a third network device 170n (an asset) may be managed by a vendor network controller 152a of a first vendor network services cloud 150a and not by one of the enterprise management entities, such as the on-prem network controller and management systems 160.

The on-prem network controller and management systems 160 is a management entity that is a software defined network controller that manages assets of an enterprise, such as some of the network devices 170*a-n*. Specifically, the on-prem network controller and management systems 160 manages and controls various enterprise assets and software either directly or through underlying domain controllers.

The managements entities (the cloud network controller and management systems 140, the network controllers 152*a-n* of the vendor network services clouds 150*a-n*, the on-prem network controller and management systems 160, and various network controllers of the cloud-based services 130*a-n*) store features and/or service capabilities of the respective assets (such as the enterprise assets 172). The capabilities include troubleshooting and service capabilities, such as network packet capture, flow statistics, utilization statistics, etc. Additionally, the management entities are configured to enable or disable one or more features or service capabilities on their respective managed assets.

The enterprise assets 172 include a number of assets represented by network devices 170*a-n*, the terms "network devices" and "assets" are used interchangeably throughout the description. The network devices 170*a-n* are network/computing equipment and/or software (resources or assets) that are managed by various network controller and managements entities. For example, the first network device 170*a* and the second network device 170*b* of an enterprise may be managed by the on-prem network controller and management systems 160 and/or the cloud network controller and management systems 140, and the third network device 170*n* may be managed by a third party such as the vendor network controller 152*a* of the first vendor network services cloud 150*a*. The security and/or security policies of an enterprise for the network devices 170*a-n* may be managed by the cloud network controller and management systems 140.

The network devices 170*a-n* may include any type of network devices or network nodes such as controllers, access points, gateways, switches, routers, hubs, bridges, modems, firewalls, intrusion protection devices/software, repeaters, servers, etc. The network devices 170*a-n* may include virtual nodes such as virtual machines, containers, point of delivery (PoD), and software such as system software (operating systems), firmware, security software such as firewalls, and other software products.

Associated with the network devices 170*a-n* is configuration data representing various configurations such as enabled and disabled features, service capabilities, troubleshooting capabilities, etc. Some of the network devices 170*a-n*, located at various enterprise sites, represent IT environment of the enterprise. The enterprise sites may be physical locations such as one or more data centers, facilities, one or more branch sites, or buildings, located across geographic areas that designated to host some of these network devices 170*a-n*. The enterprise sites may further include one or more virtual data centers, which are a pool or a collection of cloud-based infrastructure resources specifically designed for enterprise needs, and/or for cloud-based service provider needs.

The client device 180 is an endpoint or a user device such as a personal computer, laptop, tablet, mobile devices, etc. The client device 180 has various configurable features such as service capabilities such as troubleshooting capabilities. The client device 180 uses the cloud-based services 130*a-n* via the network devices 170*a-n*.

The enterprise assets 172 such as some of the network devices 170*a-n*, provide, to the cloud portal 120, via telemetry techniques, data about their operational status and configurations so that the cloud portal 120 is continuously updated about the operational status, configurations, software versions, etc. of each instance of various assets in the enterprise network 174.

FIGS. 2-6 are diagrams illustrating a mechanism for collecting and analyzing multi-cloud diagnostics data, according to one example embodiment. Reference is also made to FIG. 1 for purposes of the description of FIGS. 2-6. FIGS. 2-6 depict an example of one of the cloud-based services 130*a-n* in a form of a service provider cloud 210. For example, the service provider cloud 210 is a collaboration service provider cloud configured to provide collaboration services to end users of an enterprise via the client device 180. An end user joins a collaboration session using the client device 180 that is connected to a local network. The collaboration sessions (virtual/online meetings) are available as a SaaS from the service provider cloud 210. An example of the network deployment in FIGS. 2-6 includes a branch network having various assets or network devices 170*a-n* such as access points, switches, routers, and software. The network devices 170*a-n* or assets are managed by one or more network controllers and/or network management systems. In this example deployment, the network management clouds (such as the on-prem network controller and management systems 160, the first vendor network service cloud 150*a*), security clouds (such as the cloud network controller and management systems 140), and the service provider cloud 210, are independent entities and do not share information directly with each other unless approved by the enterprise as part of the integration process with the enterprise service cloud portal 120.

In FIGS. 2-6, performance of the cloud-based service is determined by performing multi-cloud troubleshooting with respect to a media quality issue of a collaboration cloud service, according to an example embodiment.

Figure 2:
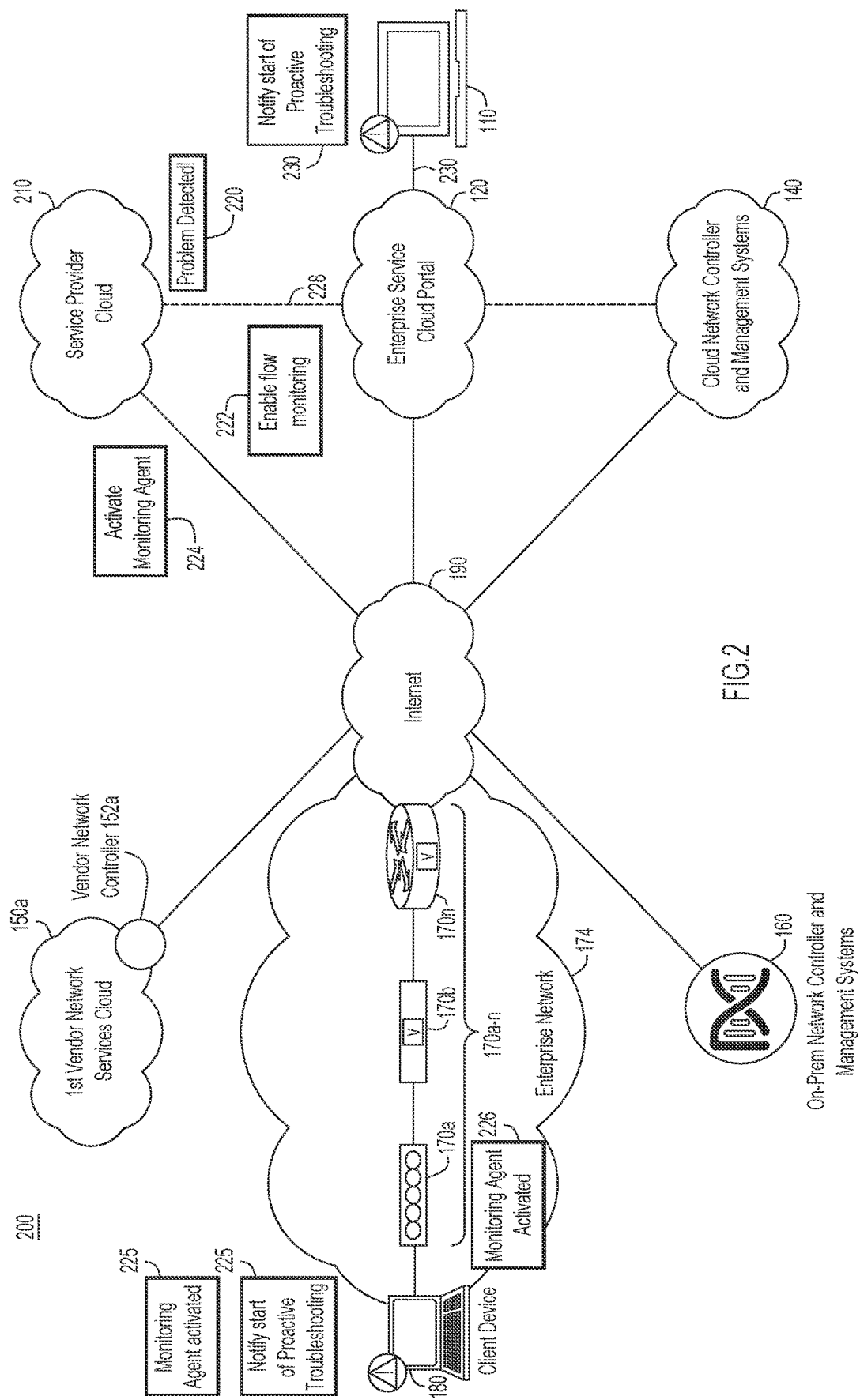
FIG. 2 is a diagram illustrating a process of initiating performance monitoring of a cloud-based service, according to an example embodiment.

Specifically, FIG. 2 is a diagram illustrating a process 200 of initiating monitoring performance of a cloud-based service, according to an example embodiment. For example, the process 200 initiates a multi-cloud troubleshooting of a media quality issue experienced by the client device 180 in a collaboration cloud service.

At 220, the service provider cloud 210 detects a media quality problem in a collaboration session that involves participation by the client device 180, and notifies the cloud portal 120. The notification may be a request for diagnostics data to monitor performance of the cloud-based service executing in the service provider cloud 210. The notification includes an identifier of the collaboration session, an identifier of the client device 180, a description of the media quality problem, and other useful metadata (timestamps, etc.).

At 222, the cloud portal 120 sends a request, to the service provider cloud 210, to enable performance monitoring or troubleshooting such as the network flow monitoring. Specifically, the cloud portal 120 analyzes data in the notification and determines the service capability within the client device 180 that should be activated, such as a network-monitoring agent, based on the asset inventory available at the cloud portal 120. The request may include the identifier of the collaboration session, the identifier of the client device 180, and the feature or service capability to enable (the network monitoring agent).

At 224, the service provider cloud 210 sends, to the client device 180, a request to activate the network-monitoring agent for the network flow monitoring. This is one non-limiting example of enabling active troubleshooting or service capability on the client device 180. In another example embodiment, the cloud portal 120 may communicate directly with the client device 180 and notify the service provider cloud 210 that the active troubleshooting is enabled.

Based on the request from the service provider cloud 210 or the cloud portal 120, at 225, the client device 180 enables the network monitoring agent and informs the user of the client device 180 that the network monitoring agent has been activated to monitor performance and resolve the performance issue, such as bad media quality. Additionally, at 226, the client device 180 notifies the service provider cloud 210 that the network monitoring agent has been activated. Alternatively or in addition, the client device 180 directly notifies the cloud portal 120 that the network monitoring agent is activated (via telemetry data). Alternatively or in addition, the client device 180 notifies the end user that the proactive troubleshooting has been activated or deactivated.

At 228, the service provider cloud 210 notifies the cloud portal 120 that monitoring of the performance of the cloud-based service (troubleshooting) has been initiated. At 230, the cloud portal 120 informs the network operator, via the network operator console 110, that the monitoring of performance and/or proactive troubleshooting has been initiated.

Figure 3:
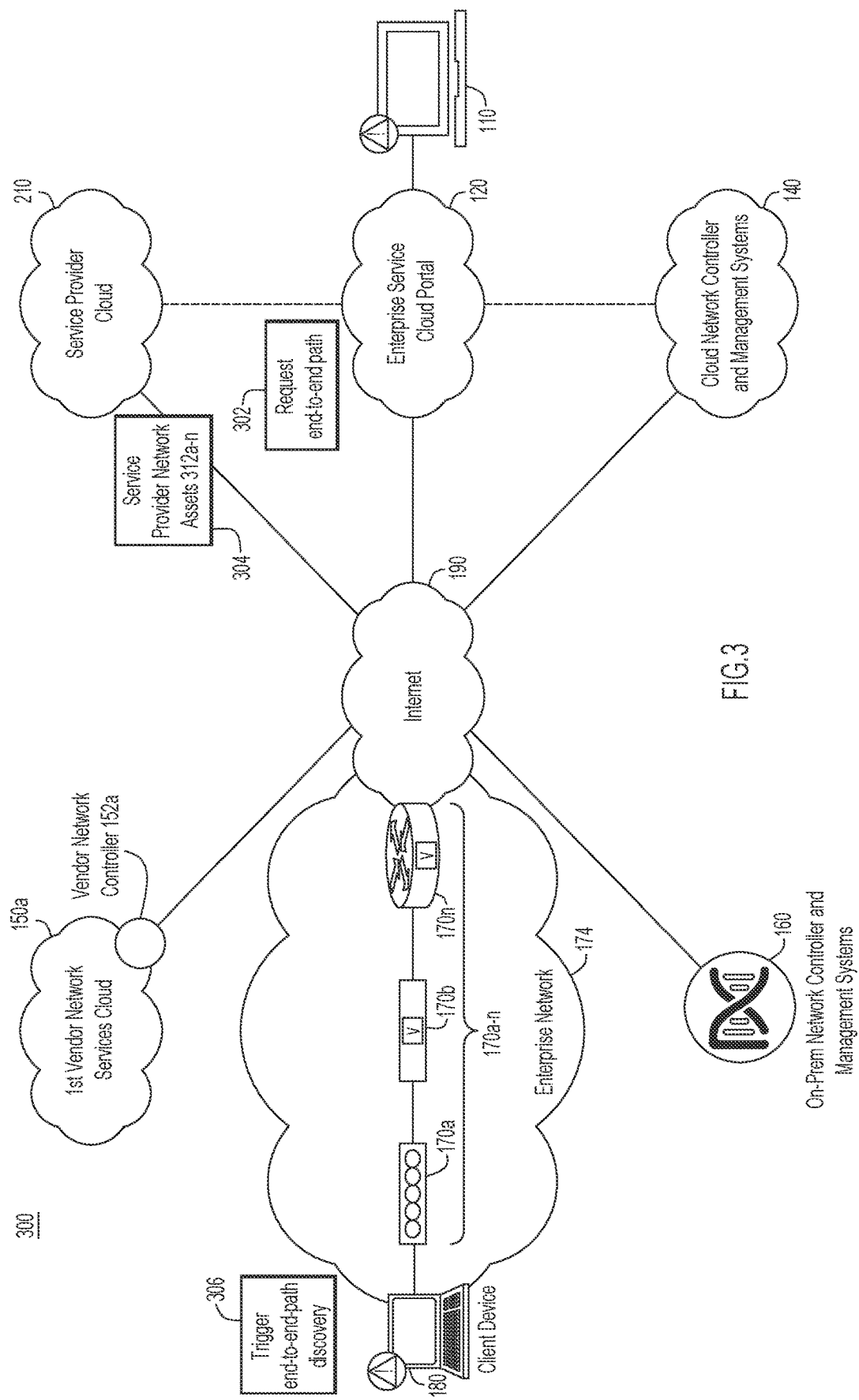
FIG. 3 is a diagram illustrating a discovery process of discovering an end-to-end path for an application flow of a cloud-based service, according to an example embodiment.

FIG. 3 is a flow diagram illustrating a discovery process 300 of discovering an end-to-end path for an application flow of the cloud-based service, according to an example embodiment. The discovery process 300 is performed after the monitoring of performance has been initiated (after completing the process 200), according to one example non-limiting embodiment.

At 302, the cloud portal 120 sends, to the service provider cloud 210, a request to perform end-to-end path discovery in which an end-to-end path, from the client device 180 of the enterprise network cloud to at least one server of the service provider cloud 210 that provides the cloud-based service to the client device 180, is identified. The request includes the identifier of the collaboration session, the identifier of the client device 180, and actions to perform (end-to-end path discovery process).

At 304, the service provider cloud 210 requests the client device 180 to simulate a service flow or triggers the simulation of the service flow on the client device 180.

At 306, the client device 180 initiates, using an agent-based solution for example, the end-to-end path discovery process by simulating the service flow. The service flow is an end-to-end simulation flow from the client device 180 to at least one server of the service provider cloud 210 that provides the cloud-based service to the client device 180. At 308, the service provider cloud 210 obtains the simulation service flow.

Based on the simulation service flow, the service provider cloud 210 determines the end-to-end path between the client device 180 and at least one server that provides the cloud-based service such as the collaboration session. Specifically, the service provider cloud 210 identifies the assets discovered on the end-to-end path (the network devices 170*a-n* and provider network assets 312*a-n*) and generates a list of these assets. The list includes an identification of the assets of various different cloud networks involved in providing the cloud-based service to the client device 180. For example, the list includes the first network device 170*a* and the second network device 170*b* of the enterprise network 174, the third network device 170*n* of the first vendor network services cloud 150*a* (the vendor cloud network), and service provider network assets 312*a-n* of the service provider cloud 210 (the provider cloud network).

Figure 4:
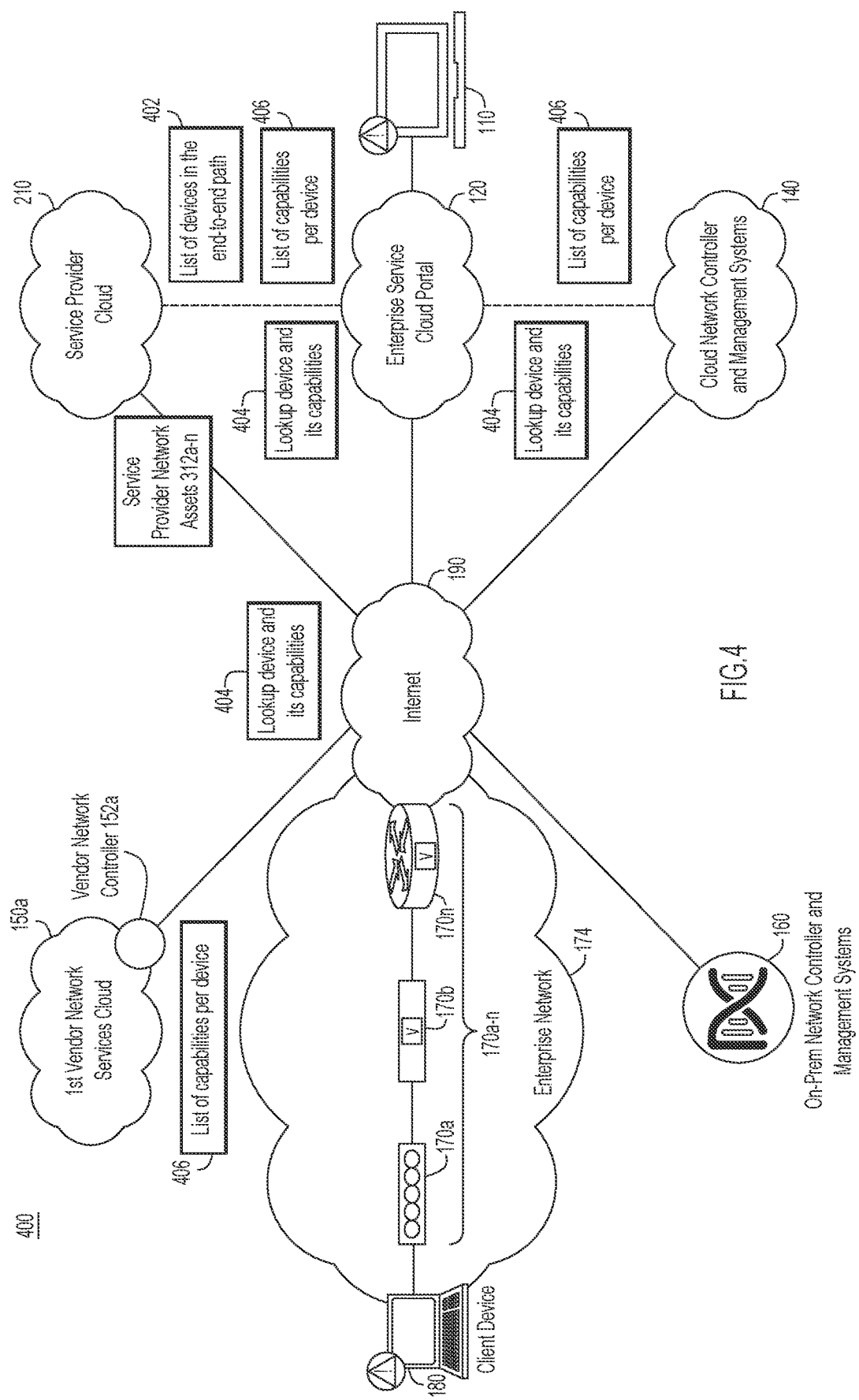
FIG. 4 is a diagram illustrating a process of determining capabilities of assets involved in providing cloud-based service through multi-cloud interactions, according to an example embodiment.

FIG. 4 is a flow diagram illustrating a process 400 of determining capabilities of assets involved in providing the cloud-based service through multi-cloud interactions, according to an example embodiment. In one example embodiment, the process 400 is performed using the list of assets obtained in the discovery process 300.

At 402, the service provider cloud 210 provides, to the cloud portal 120, the list of assets (the network devices 170*a-n* and the service provider network assets 312*a-n*) in the end-to-end network path obtained through the discovery process 300. The cloud portal 120 analyzes the list of assets to identify a network management entity of the respective asset for each of the assets on the list. The network management entity may be one of the on-prem network controller and management systems 160, a security and IoT cloud management systems, the cloud based network controller and management systems 140, vendor network controllers 152*a-n* of various vendor network services 150*a-n*. The management entities are identified, for each asset on the list, based on an attribute set of a respective asset that was provided to the cloud portal 120 at the time of integration.

At 404, the cloud portal 120 communicates with the on-prem network controller and management systems 160, the cloud network controller and management systems 140, the vendor network controller 152*a* of the first vendor network services cloud 150*a*, and the service provider cloud 210, to lookup service capabilities for each asset on the list such as a list of troubleshooting and monitoring capabilities of the respective asset. The troubleshooting and monitoring capabilities include network packet capture, flow statistics, utilization statistics, etc.

At 406, the cloud portal 120 obtains a list of capabilities for each asset on the list managed by various different cloud network management systems (the on-prem network controller and management systems 160, the cloud network controller and management systems 140, the first vendor network services cloud 150*a*, and the service provider cloud 210).

Figure 5:
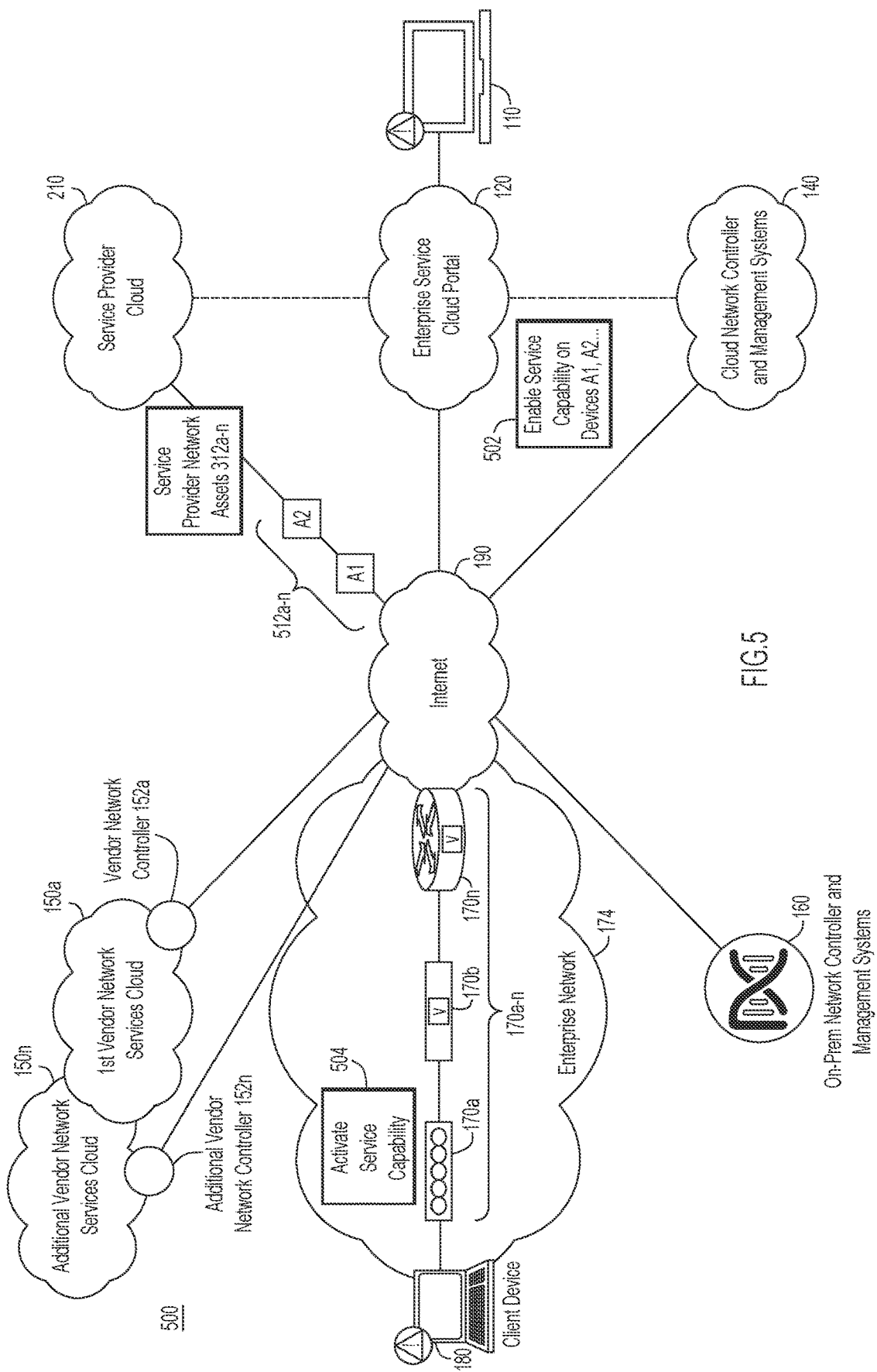
FIG. 5 is a diagram illustrating a process of enabling one or more service capabilities of the assets involved in providing the cloud-based service and managed by different cloud-based management systems, according to an example embodiment.

FIG. 5 is a flow diagram illustrating a process 500 of enabling one or more service capabilities of the assets involved in providing the cloud-based service and managed by different cloud-based management systems, according to an example embodiment. In FIG. 5, additional network assets 512*a-n* are depicted that are involved in providing the cloud-based service to the client device 180 and an additional vendor network services cloud 150*n* (a network vendor cloud network) with an additional vendor network controller 152*n*.

The cloud portal 120 analyzes the service capabilities of each respective asset based on a set of the service capabilities of the respective asset and selects one or more service capability (troubleshooting and monitoring capabilities) that apply to monitoring the performance of the cloud-based service and/or to troubleshoot a problem event or performance issue with respect to the cloud-based service. The selected service capabilities are applicable to the monitoring the performance or troubleshooting. For example, the packet capture and flow statistics capabilities for the service flow of interest may be selected by the cloud portal 120 to troubleshoot a media quality issue in the collaboration session. At 502, the cloud portal 120 communicates with the respective management entities to request that the selected service capability be enabled on the respective asset.

In one example, the cloud portal 120 communicates with (1) the on-prem network controller and management systems 160 and/or the cloud network controller and management systems 140 to enable the selected service capabilities of capturing flow statics on the first network device 170a and the second network device 170b, (2) the vendor network controller 152a to enable selected service capability such as the network packet capture on the third network device 170n, (3) an additional vendor network controller 152n of the additional vendor network services cloud 150n to enable service capabilities such as capture flow statistics, on the network assets 512a-n (assets A1 and A2) managed by the additional vendor network controller 152n, and (4) the service provider cloud 210 to enable service capabilities on the service provider network assets 312a-n.

At 504, the respective management entities enable the selected service capability for the respective asset based on the request. For example, the on-prem network controller and management systems 140 and/or the cloud network controller and management systems 140 activates the troubleshooting and monitoring capabilities on the first network device 170a and the second network device 170b; the vendor network controller 152a enables the selected service capability (the network packet capture) on the third network device 170n; the additional vendor network controller 152n of the additional vendor network services cloud 150n enables selected service capabilities (capture flow statistics) on the network assets 512a-n (assets A1 and A2); and the service provider cloud 210 enables the selected service capabilities on the service provider network assets 312a-n.

Based on the process 500, the multi-cloud network deployment (the system 100 of FIG. 1) is ready to collect multi-cloud diagnostics data to monitor performance or resolve a performance issue such as degraded media quality in the collaboration session.

Figure 6:
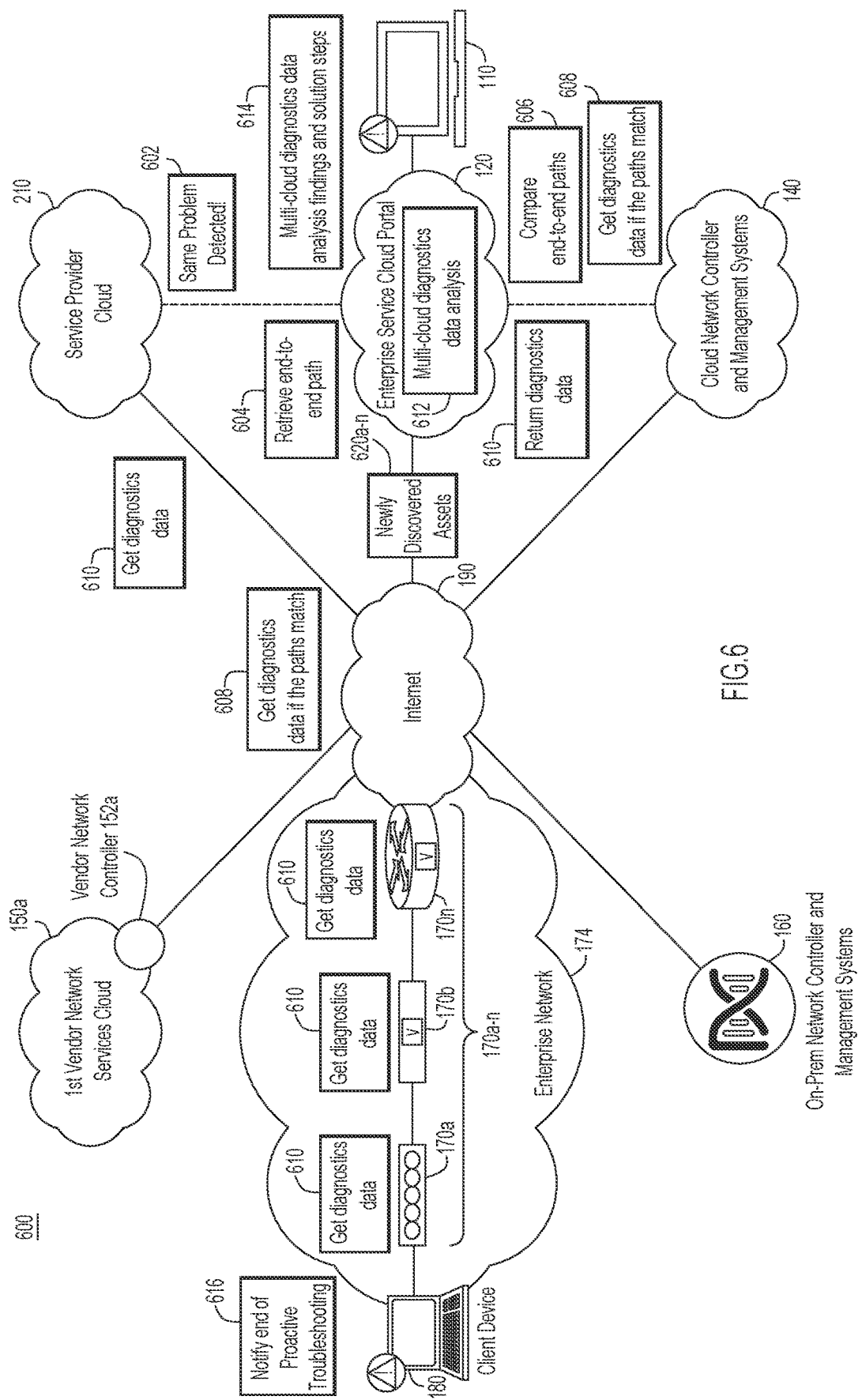
FIG. 6 is a diagram illustrating a process of performing active multi-cloud troubleshooting based on multi-cloud diagnostics data collected from the assets involved in providing the cloud-based service, according to an example embodiment.

FIG. 6 is a flow diagram illustrating a process 600 of performing active multi-cloud troubleshooting based on multi-cloud diagnostics data collected from the assets involved in providing the cloud-based service, according to an example embodiment. The process 600 may involve newly discovered assets 620a-n that are involved in providing the cloud-based service.

At 602, the service provider cloud 210 detects another instance or a repeating occurrence of the same problem event and notifies the cloud portal 120. For example, the repeating occurrence of the same problem event is reoccurring degraded media quality experienced in the collaboration session by the client device 180. The service provider cloud 210 sends a notification to the cloud portal 120 about a repeating occurrence of the problem event occurring in the cloud-based service.

The cloud portal 120 associates the event to an active troubleshooting session and performs the following operations. At 604, the cloud portal 120 retrieves the end-to-end path for the service flow (actual service flow) associated with the second event. At 606, the cloud portal 120 determines if the end-to-end paths of the simulated service flow obtained in the discovery process 300 and the actual service flow are the same.

At 608, if the end-to-end paths of the service flows match, the cloud portal 120 retrieves contextual data from each respective asset of interest by contacting the asset and/or the respective network management entity, security and IoT clouds that manage the respective asset. Specifically, at 610, contextual data (part of the diagnostics data) is collected from each of the network devices 170a-n, the service provider cloud 210, and the cloud network controller and management systems 140. The collected contextual data, gathered by each of the assets involved in providing the cloud-based service, is part of the diagnostics data that is aggregated to form the multi-cloud diagnostics data. The collected contextual data may be obtained directly from the assets and/or via the respective network management entities.

On the other hand, if the end-to-end paths of the simulated and actual service flows are not the same, the process 600 further involves repeating the discovery process 300 of FIG. 3 in which the end-to-end path of the actual service flow is identified. The cloud portal 120 obtains additional information about the assets that form the end-to-end path of the actual service flow. The additional information (list of assets) that form the end-to-end path of the actual service flow are compared to the service information (list of assets) that form the end-to-end path for simulation service flow. The newly discovered assets 620a-n are then added to the service information. For the newly discovered assets 620a-n, the process 400 of FIG. 4 is performed in which relevant troubleshooting and monitoring capabilities are enabled on the newly discovered assets 620a-n by communicating with respective network controllers of their respective cloud networks. The newly discovered assets 620a-n are then enabled to also collect the diagnostics data related to the repeating occurrence of the problem event. The cloud portal 120 then waits for another occurrence of the problem event to collect the diagnostics data.

At 612, based on the contextual data (diagnostics data) collected at 610 from multiple assets (the network devices 170a-n and the newly discovered assets 620a-n) managed by multiple controllers such as the on-prem network controller and management systems 160, the service provider cloud 210, the vendor network controller 152a, and the cloud network controller and management systems 140, the cloud portal 120 analyzes the aggregated, multi-cloud diagnostics data to identify the source of problem event (packet loss, jitter, delay, high CPU utilization, faulty ports, high memory utilization, etc.) in one or more of the assets along the end-to-end path. Specifically, the cloud portal 120 analyzes the multi-cloud diagnostics data that may be collected from multiple occurrences of the performance issue or problem event and determines various actions that may help resolve the performance issue and selects one or more actions based on this diagnostics data.

At 614, the cloud portal 120 informs the network administrator of the multi-cloud diagnostics data analysis findings and suggests next steps or actions to resolve the performance issue. For example, actions may include changing a configuration of one or more of the network devices 170a-n and/or upgrading one or more of the network devices 170a-n with a new software version, to improve media quality for the collaboration session with the client device 180. The actions may further include a contextual insight about the performance issue and a set of available actions (such as possible reconfigurations, feature enablement or disablements, etc.) to resolve the performance issue.

At 616, after taking the steps to remediate the performance issue, the network administrator marks the troubleshooting or performance-monitoring workflow as completed, which triggers the cloud portal 120 to disable troubleshooting of the specific problem event. The cloud portal informs the service provider cloud 210, which then notifies the user of the client device 180 that the proactive troubleshooting has ended and the issue has been resolved. The cloud portal 120 may further communicate with various management entities of the assets forming the end-to-end path to disable service capabilities on these assets.

In one example embodiment, the cloud portal 120 receives events from multiple clouds, co-relates the events, and triggers an automated troubleshooting scenario.

The techniques described above provide automated multi-cloud troubleshooting and analysis empowering the network administrators to monitor performance or solve performance issues by themselves in their respective enterprise networks, reducing time and effort. The techniques enable cloud-based network, collaboration, security, and IoT clouds to provide a seamless enterprise experience and achieve case deflection at large scale. This case deflection mechanism performs automated multi-cloud performance monitoring, troubleshooting, and solution level analysis within the cloud portal 120. The techniques leverage visibility into several multi-vendor network management, collaboration, security, and IoT clouds to detect performance issues and problem events, perform end-to-end path discovery, identify network controllers for the assets of interest that form the end-to-end path, obtain contextual, multi-cloud diagnostics data from these assets and perform multi-cloud diagnostics data analysis. The cloud portal 120 informs an enterprise network operator and end users about the steps taken to proactively troubleshoot and resolve the performance issues.

Figure 7:
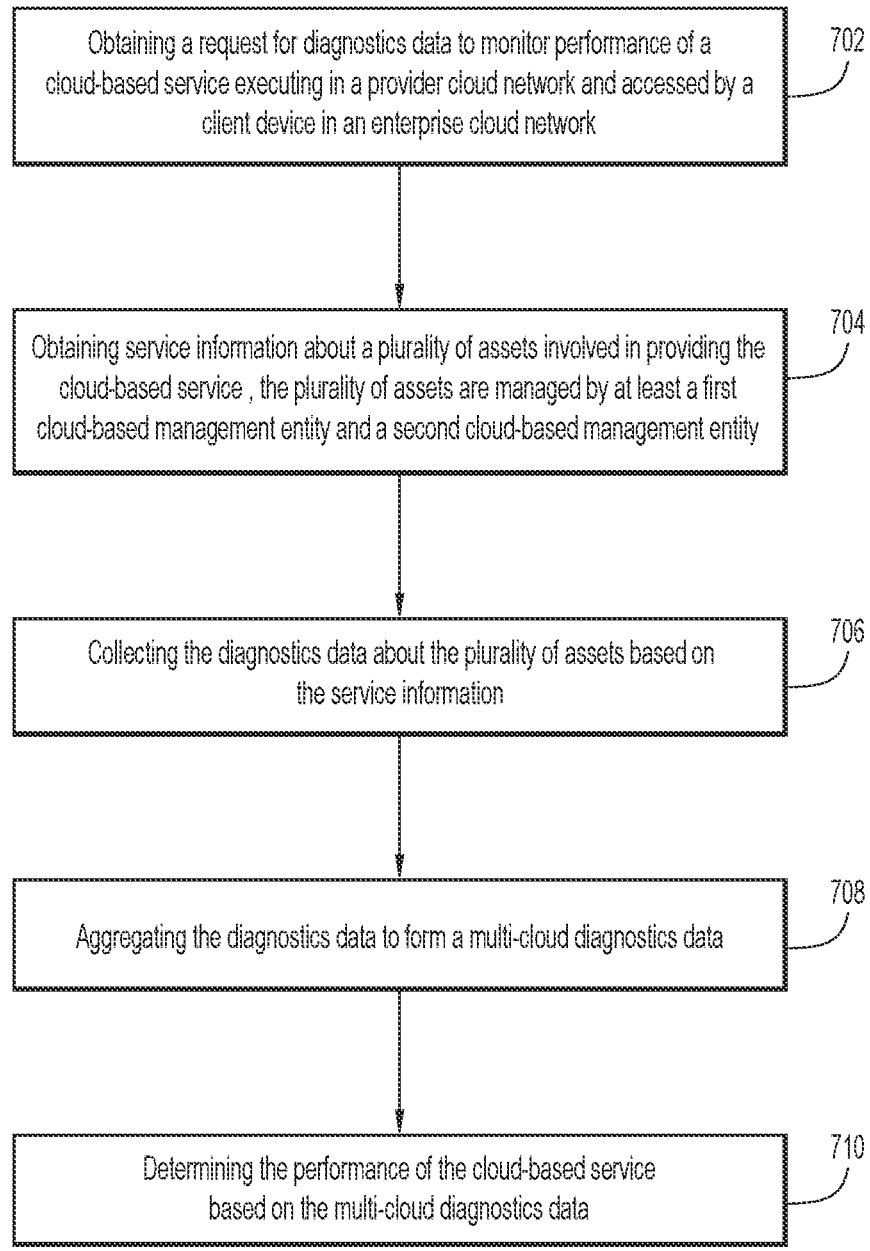
FIG. 7 is a flowchart illustrating a method of collecting diagnostics data to determine performance of a cloud-based service, according to an example embodiment.

FIG. 7 is a flowchart illustrating a method 700 of collecting multi-cloud diagnostics data to determine performance of a cloud-based service, according to an example embodiment. The method 700 may be implemented by a computing device such as an orchestrator device or a server or a group of servers that execute a service or the cloud portal 120 of FIGS. 1-6.

At 702, the method 700 involves obtaining a request for diagnostics data to monitor performance of a cloud-based service executing in a provider cloud network and accessed by a client device in an enterprise network.

At 704, the method 700 further involves obtaining service information about a plurality of assets involved in providing the cloud-based service. The plurality of assets are managed by at least a first cloud-based management entity and a second cloud-based management entity.

At 706, the method 700 further involves collecting the diagnostics data about the plurality of assets based on the service information.

At 708, the method 700 further involves aggregating the diagnostics data to form a multi-cloud diagnostics data.

At 710, the method 700 further involves determining the performance of the cloud-based service based on the multi-cloud diagnostics data.

In the method 700, the at least first cloud-based management entity and the second cloud-based management entity may include a first network controller that manages a first asset set of the plurality of assets, a second network controller that manages a second asset set of the plurality of assets, and a third party cloud-based management entity that manages a third asset set of the plurality of assets. Each of the first network controller and the second network controller may be a cloud-based network controller or an on-premise network controller.

In the method 700, the request for the diagnostics data may be triggered by detecting a performance issue in the cloud-based service. The method 700 may further involve analyzing the multi-cloud diagnostics data collected from the first network controller, the second network controller, and the third party cloud-based management entity and selecting at least one action for resolving the performance issue from a plurality of actions based on analyzing the multi-cloud diagnostics data.

In one form, the method 700 may further involve performing the at least one action which includes a change in a configuration of one or more of the plurality of assets.

According to one or more example embodiments, the at least one action may include a contextual insight about the performance issue and a set of available actions to resolve the performance issue. The method 700 may further involve providing, to a network operator via a device of the enterprise network, the contextual insight.

In one instance, the operation 704 of obtaining the service information about the plurality of assets involved in providing the cloud-based service may include obtaining, from the provider cloud network, identification of the plurality of assets involved in providing the cloud-based service to the client device based on a discovery process, triggered at the client device, in which an end-to-end path is identified, the end-to-end path being from the client device to at least one server of the provider cloud network that provides the cloud-based service to the client device.

According to one or more example embodiments, in the method 700, the discovery process may include simulating a service flow from the client device of the enterprise network to obtain the identification of the plurality of assets involved in providing the cloud-based service.

In another form, the method 700 may further involve, for each of the plurality of assets, identifying a respective network controller of the at least first cloud-based management entity and the second cloud-based management entity based on an attribute set of a respective asset and obtaining, from the respective network controller, troubleshooting and monitoring capabilities of the respective asset.

According to one or more example embodiments, the method 700 may further involve communicating with the respective network controller to enable at least one of the troubleshooting and monitoring capabilities of the respective asset that applies to monitoring the performance in the cloud-based service. The at least one of the troubleshooting and monitoring capabilities, when enabled, causes the respective asset to collect contextual data that is part of the diagnostics data.

In one instance, the operation 708 of determining the performance may include detecting a problem event related to the cloud-based service. The method 700 may further involve obtaining a notification about a repeating occurrence of the problem event occurring in the cloud-based service, obtaining additional information about a set of assets in an end-to-end path for a service flow of the cloud-based service, the end-to-end path being from the client device of the enterprise network to at least one server in the provider cloud network and relating to the repeating occurrence of the problem event, determining whether one or more assets from the set of assets is not included in the plurality of assets, and enabling collection of the diagnostics data about the one or more assets determined not to be included in the plurality of assets.

In the method 700, the plurality of assets may include a first asset managed by the first cloud-based management entity, a second asset managed by the second cloud-based management entity, and a third asset managed by a network vendor cloud management entity. The method 700 may further involve, for each of the plurality of assets, identifying a respective management entity based on the service information about of the plurality of assets, obtaining, from the respective management entity, a set of service capabilities for a respective asset, selecting, for the respective asset, at least one capability from the set of service capabilities that include network packet capture, flow statistics, and utilization statistics, and communicating with the respective management entity to enable the at least one capability selected for the respective asset such that the diagnostics data is collected about the plurality of assets based on the at least one capability being enabled.

Figure 8:
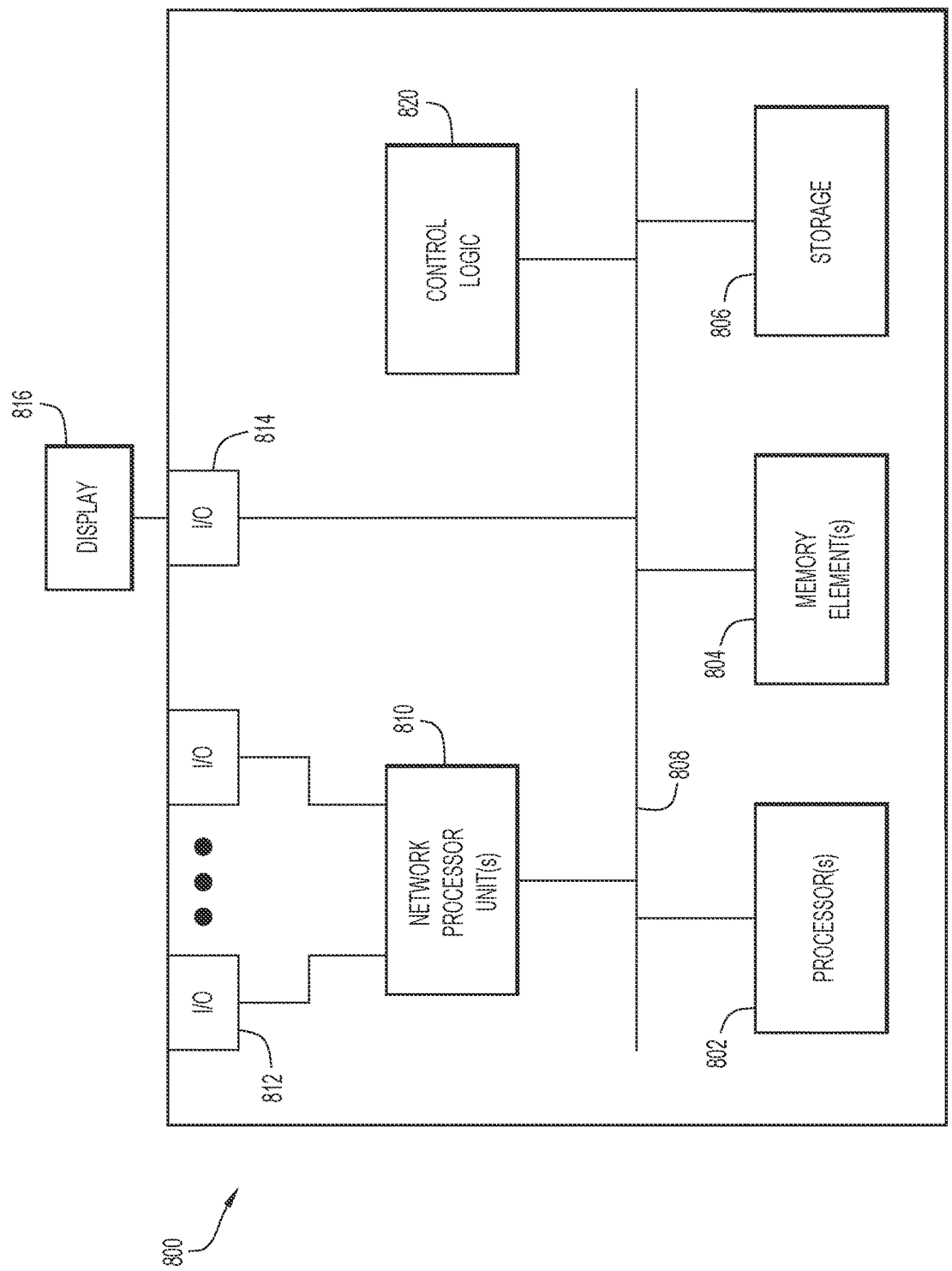
FIG. 8 is a hardware block diagram of a computing device that may perform functions associated with any combination of operations in connection with the techniques depicted and described in FIGS. 1-7.

FIG. 8 is a hardware block diagram of a computing device 800 that may perform functions associated with any combination of operations in connection with the techniques depicted and described in FIGS. 1-7, including, but not limited to, operations of the computing device or one or more servers that execute the cloud portal 120 and serve as an orchestrator device. Further, the computing device 800 may be representative of a client device 180, one of the assets or network devices 170a-n, a server of one of the cloud networks, a controller of one of the cloud networks, or the network operator console 110. It should be appreciated that FIG. 8 provides only an illustration of one embodiment and does not imply any limitations with regard to the environments in which different embodiments may be implemented. Many modifications to the depicted environment may be made.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with one or more memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to the computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 816, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided such as the computing device executing the cloud portal 120 of FIGS. 1-6 and serving as an orchestrator device. The apparatus includes a memory, a network interface configured to enable network communications, and a processor. The processor is configured to perform various operations. The operations include obtaining a request for diagnostics data to monitor performance of a cloud-based service executing in a provider cloud network and accessed by a client device in an enterprise network, obtaining service information about a plurality of assets involved in providing the cloud-based service. The plurality of assets are managed by at least a first cloud-based management entity and a second cloud-based management entity. The operations further include collecting the diagnostics data about the plurality of assets based on the service information, aggregating the diagnostics data to form a multi-cloud diagnostics data, and determining the performance of the cloud-based service based on the multi-cloud diagnostics data.

In yet another example embodiment, one or more non-transitory computer readable storage media encoded with instructions are provided. When the media is executed by a processor, the instructions cause the processor to execute a method involving obtaining a request for diagnostics data to monitor performance of a cloud-based service executing in a provider cloud network and accessed by a client device in an enterprise network and obtaining service information about a plurality of assets involved in providing the cloud-based service. The plurality of assets are managed by at least a first cloud-based management entity and a second cloud-based management entity. The operations further include collecting the diagnostics data about the plurality of assets based on the service information, aggregating the diagnostics data to form a multi-cloud diagnostics data, and determining the performance of the cloud-based service based on the multi-cloud diagnostics data.

In yet another example embodiment, a system is provided that includes the devices and operations explained above with reference to FIGS. 1-8.

The programs described herein (e.g., control logic 820) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 806 and/or memory elements(s) 804 can store data, software, code, instructions (e.g., processor instructions), logic, parameters, combinations thereof, and/or the like used for operations described herein. This includes the storage 806 and/or memory elements(s) 804 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of, 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining a request for diagnostics data to monitor performance of a cloud-based service executing in a provider cloud network and accessed by a client device in an enterprise network;
   obtaining service information about a plurality of assets involved in providing the cloud-based service including:
   simulating a service flow from the client device to the cloud-based service,
   determining each of the plurality of assets in an end-to-end path that is from the client device of the enterprise network to at least one server that executes the cloud-based service in the provider cloud network, based on the service flow, wherein the plurality of assets are managed by at least a first cloud-based management entity and a second cloud-based management entity;
   identifying a management entity for each respective asset of the plurality of assets; and
   communicating with the management entity for each respective asset to enable troubleshooting and monitoring capabilities of each respective asset;
   collecting the diagnostics data about the plurality of assets based on the service information and using the troubleshooting and monitoring capabilities of each respective asset that are enabled;
   aggregating the diagnostics data to form a multi-cloud diagnostics data; and
   determining the performance of the cloud-based service based on the multi-cloud diagnostics data.

2. The method of claim 1, wherein at least the first cloud-based management entity and the second cloud-based management entity include a first network controller that manages a first asset set of the plurality of assets, a second network controller that manages a second asset set of the plurality of assets, and a third party cloud-based management entity that manages a third asset set of the plurality of assets and wherein each of the first network controller and the second network controller is a cloud-based network controller or an on-premise network controller.

3. The method of claim 2, wherein the request for the diagnostics data is triggered by detecting a performance issue in the cloud-based service, and further comprising:
   analyzing the multi-cloud diagnostics data collected from the first network controller, the second network controller, and the third party cloud-based management entity; and
   selecting at least one action for resolving the performance issue from a plurality of actions based on analyzing the multi-cloud diagnostics data.

4. The method of claim 3, further comprising:
performing the at least one action which includes a change in a configuration of one or more of the plurality of assets.

5. The method of claim 3, wherein the at least one action includes a contextual insight about the performance issue and a set of available actions to resolve the performance issue, and further comprising:
providing, to a network operator via a device of the enterprise network, the contextual insight.

6. The method of claim 1,
wherein the troubleshooting and monitoring capabilities, when enabled, causes each respective asset to collect contextual data that is aggregated to form the diagnostics data.

7. The method of claim 1, wherein determining the performance includes detecting a problem event related to the cloud-based service, and the method further comprising:
obtaining a notification about a repeating occurrence of the problem event occurring in the cloud-based service;
obtaining additional information about a set of assets in the end-to-end path for the service flow of the cloud-based service, the end-to-end path relating to the repeating occurrence of the problem event;
determining whether one or more assets from the set of assets is not included in the plurality of assets; and
enabling collection of the diagnostics data about the one or more assets determined not to be included in the plurality of assets.

8. The method of claim 1, wherein the plurality of assets include a first asset managed by the first cloud-based management entity, a second asset managed by the second cloud-based management entity, and a third asset managed by a network vendor cloud management entity and further comprising, for each of the plurality of assets:
obtaining, from the management entity, a set of service capabilities for a respective asset;
selecting, for the respective asset, at least one capability from the set of service capabilities that include network packet capture, flow statistics, and utilization statistics; and
communicating with the management entity to enable the at least one capability selected for the respective asset such that the diagnostics data is collected about the plurality of assets based on the at least one capability being enabled.

9. The method of claim 1, wherein the request includes a first identifier of the cloud-based service, a second identifier of the client device, and an instruction to perform an end-to-end path discovery process that includes identifying each of the plurality of assets in the end-to-end path based on the service flow that is simulated to traverse the end-to-end path and generating a list of the plurality of assets in the end-to-end path.

10. The method of claim 9, wherein obtaining the service information about the plurality of assets involved in providing the cloud-based service further includes:
triggering a simulation of the service flow at the client device based on the instruction.

11. The method of claim 1, wherein the service flow being simulated forms an end-to-end path for a simulated service flow, determining the performance includes detecting a problem event related to the cloud-based service, and the method further comprising:
obtaining a notification about a repeating occurrence of the problem event occurring in the cloud-based service;
obtaining additional information about a set of assets in the end-to-end path for an actual service flow of the cloud-based service, the end-to-end path relating to the repeating occurrence of the problem event;
determining whether one or more assets from the set of assets is not included in the plurality of assets by comparing the end-to-end path for the actual service flow with the end-to-end path of the simulated service flow; and
enabling collection of the diagnostics data about the one or more assets determined not to be included in the plurality of assets.

12. An apparatus comprising:
a memory;
a network interface configured to enable network communications; and
a processor, wherein the processor is configured to perform operations comprising:
obtaining a request for diagnostics data to monitor performance of a cloud-based service executing in a provider cloud network and accessed by a client device in an enterprise network;
obtaining service information about a plurality of assets involved in providing the cloud-based service by:
simulating a service flow from the client device to the cloud-based service,
determining each of the plurality of assets in an end-to-end path that is from the client device of the enterprise network to at least one server that executes the cloud-based service in the provider cloud network, based on the service flow, wherein the plurality of assets are managed by at least a first cloud-based management entity and a second cloud-based management entity;
identifying a management entity for each respective asset of the plurality of assets; and
communicating with the management entity for each respective asset to enable troubleshooting and monitoring capabilities of each respective asset:
collecting the diagnostics data about the plurality of assets based on the service information and using the troubleshooting and monitoring capabilities of each respective asset that are enabled;
aggregating the diagnostics data to form a multi-cloud diagnostics data; and
determining the performance of the cloud-based service based on the multi-cloud diagnostics data.

13. The apparatus of claim 12, wherein at least the first cloud-based management entity and the second cloud-based management entity include a first network controller that manages a first asset set of the plurality of assets, a second network controller that manages a second asset set of the plurality of assets, and a third party cloud-based management entity that manages a third asset set of the plurality of assets and wherein each of the first network controller and the second network controller is a cloud-based network controller or an on-premise network controller.

14. The apparatus of claim 13, wherein the request for the diagnostics data is triggered by detecting a performance issue in the cloud-based service and the processor is further configured to perform additional operations comprising:
analyzing the multi-cloud diagnostics data collected from the first network controller, the second network controller, and the third party cloud-based management entity; and selecting at least one action for resolving the performance issue from a plurality of actions based on analyzing the multi-cloud diagnostics data.

15. The apparatus of claim 14, wherein the processor is further configured to perform an additional operation comprising:
performing the at least one action which includes a change in a configuration of one or more of the plurality of assets.

16. The apparatus of claim 14, wherein the at least one action includes a contextual insight about the performance issue and a set of available actions to resolve the performance issue and the processor is further configured to perform an additional operation comprising:
providing, to a network operator, the contextual insight.

17. The apparatus of claim 12, wherein the processor is configured to perform the operation of obtaining the service information about the plurality of assets involved in providing the cloud-based service by:
obtaining, from the provider cloud network, an identification of the plurality of assets involved in providing the cloud-based service to the client device based on a discovery process, triggered at the client device, in which the end-to-end path is identified.

18. One or more non-transitory computer readable storage media encoded with instructions that, when executed by a processor, cause the processor to execute a method comprising:
obtaining a request for diagnostics data to monitor performance of a cloud-based service executing in a provider cloud network and accessed by a client device in an enterprise network;
obtaining service information about a plurality of assets involved in providing the cloud-based service by:
simulating a service flow from the client device to the cloud-based service,
determining each of the plurality of assets in an end-to-end path that is from the client device of the enterprise network to at least one server that executes the cloud-based service in the provider cloud network, based on the service flow, wherein the plurality of assets are managed by at least a first cloud-based management entity and a second cloud-based management entity;
identifying a management entity for each respective asset of the plurality of assets; and
communicating with the management entity for each respective asset to enable troubleshooting and monitoring capabilities of each respective asset:
collecting the diagnostics data about the plurality of assets based on the service information and using the troubleshooting and monitoring capabilities of each respective asset that are enabled;
aggregating the diagnostics data to form a multi-cloud diagnostics data; and
determining the performance of the cloud-based service based on the multi-cloud diagnostics data.

19. The one or more non-transitory computer readable storage media of claim 18, wherein at least the first cloud-based management entity and the second cloud-based management entity include a first network controller that manages a first asset set of the plurality of assets, a second network controller that manages a second asset set of the plurality of assets, and a third party cloud-based management entity that manages a third asset set of the plurality of assets and wherein each of the first network controller and the second network controller is a cloud-based network controller or an on-premise network controller.

20. The one or more non-transitory computer readable storage media of claim 19, wherein the request for the diagnostics data is triggered by detecting a performance issue in the cloud-based service and the method further comprises:
analyzing the multi-cloud diagnostics data collected from the first network controller, the second network controller, and the third party cloud-based management entity; and
selecting at least one action for resolving the performance issue from a plurality of actions based on analyzing the multi-cloud diagnostics data.

* * * * *

UNITED STATES PATENT AND TRADEMARK OFFICE
CERTIFICATE OF CORRECTION

PATENT NO. : 12,307,302 B2  
APPLICATION NO. : 17/476916  
DATED : May 20, 2025  
INVENTOR(S) : Zizhen Gao et al.

Page 1 of 1

It is certified that error appears in the above-identified patent and that said Letters Patent is hereby corrected as shown below:

In the Claims

Claim 12, Column 20, Line 41, please replace "each respective asset:" with --each respective asset;--

Claim 18, Column 22, Line 8, please replace "each respective asset:" with --each respective asset;--

Signed and Sealed this  
Twenty-fourth Day of June, 2025

Coke Morgan Stewart  
*Acting Director of the United States Patent and Trademark Office*